United States Patent
Honda

(10) Patent No.: US 10,374,204 B2
(45) Date of Patent: Aug. 6, 2019

(54) NON-AQUEOUS-SECONDARY-BATTERY SEPARATOR AND NON-AQUEOUS SECONDARY BATTERY

(71) Applicant: TEIJIN LIMITED, Osaka-shi, Osaka (JP)

(72) Inventor: Susumu Honda, Yamaguchi (JP)

(73) Assignee: TEIJIN LIMITED, Osaka-shi, Osaka (JP)

( * ) Notice: Subject to any disclaimer, the term of this patent is extended or adjusted under 35 U.S.C. 154(b) by 166 days.

(21) Appl. No.: 14/766,513

(22) PCT Filed: Nov. 13, 2013

(86) PCT No.: PCT/JP2013/080718
§ 371 (c)(1),
(2) Date: Aug. 7, 2015

(87) PCT Pub. No.: WO2014/147888
PCT Pub. Date: Sep. 25, 2014

(65) Prior Publication Data
US 2015/0372277 A1 Dec. 24, 2015

(30) Foreign Application Priority Data
Mar. 19, 2013 (JP) .................. 2013-056711

(51) Int. Cl.
*H01M 2/16* (2006.01)
*H01M 2/14* (2006.01)

(52) U.S. Cl.
CPC ........... *H01M 2/1686* (2013.01); *H01M 2/14* (2013.01); *H01M 2/16* (2013.01); *H01M 2/164* (2013.01); *H01M 2/166* (2013.01); *H01M 2/168* (2013.01); *H01M 2/1646* (2013.01); *H01M 2/1653* (2013.01); *H01M 2/1666* (2013.01)

(58) Field of Classification Search
CPC ........ H01M 2/164; H01M 2/166; H01M 2/168
See application file for complete search history.

(56) References Cited

U.S. PATENT DOCUMENTS

| | | | |
|---|---|---|---|
| 2012/0077113 A1 | 3/2012 | Kim et al. | |
| 2012/0115008 A1* | 5/2012 | Sano ................ | H01M 2/1653 429/144 |
| 2013/0130092 A1* | 5/2013 | Roth ................ | H01M 2/1606 429/144 |
| 2013/0273407 A1* | 10/2013 | Kylyvnyk .......... | H01M 2/1673 429/144 |
| 2013/0302661 A1* | 11/2013 | Kim ................. | H01M 2/145 429/144 |
| 2013/0323607 A1* | 12/2013 | Issaev ............. | H01M 2/1653 429/338 |

FOREIGN PATENT DOCUMENTS

| | | |
|---|---|---|
| JP | 2000030686 A | 1/2000 |
| JP | 4988972 B1 | 8/2012 |
| JP | 2012529742 A | 11/2012 |
| JP | 2013-020769 A | 1/2013 |
| WO | WO 2011/118660 * 9/2011 | .......... H01M 2/1653 |

OTHER PUBLICATIONS

International Search Report for PCT/JP2013/080718 dated Jan. 28, 2014.

* cited by examiner

Primary Examiner — Jeremiah R Smith
(74) Attorney, Agent, or Firm — Sughrue Mion, PLLC

(57) ABSTRACT

There is provided a non-aqueous-secondary-battery separator formed of a composite membrane including: a porous base material containing a thermoplastic resin; and a heat-resistant porous layer provided on one or both surfaces of the porous base material and containing an organic binder and an inorganic filler, in which the tortuosity rate of the composite membrane is from 1.5 to 2.0.

12 Claims, No Drawings

NON-AQUEOUS-SECONDARY-BATTERY SEPARATOR AND NON-AQUEOUS SECONDARY BATTERY

TECHNICAL FIELD

The present invention relates to a non-aqueous-secondary-battery separator and a non-aqueous secondary battery.

BACKGROUND ART

A non-aqueous secondary battery represented by a lithium ion secondary battery has been widely used as a main power source of a notebook electronic apparatus such as a mobile phone or a notebook computer. The non-aqueous secondary battery is widely applied to a main power source of an electric vehicle or a hybrid car, an electricity storage system of night-time electricity, and the like. With the spread of the non-aqueous secondary battery, it is necessary to ensure stable battery characteristics and safety.

In general, a porous membrane having polyolefin such as polyethylene or polypropylene as a main component is used as a non-aqueous-secondary-battery separator. However, when the battery including the polyolefin porous membrane is exposed at a high temperature, the separator may be melted down and this may cause smoking, ignition, or explosion of the battery. Accordingly, there is a demand for heat resistance in order to prevent the melt down of the separator at a high temperature.

In such viewpoints, in the related art, a separator formed by coating a heat-resistant porous layer including a heat-resistant polymer and ceramic particles on one surface of a polyethylene porous membrane is known (for example, PTL 1 and PTL 2). However, in a configuration of coating and forming the heat-resistant porous layer on a porous base material, ionic permeability of a composite membrane may be significantly deteriorated when the porous structure in the layer is not appropriately formed, compared to a case of a porous base material single body.

In recent years, an outer package of the non-aqueous-secondary-battery has been simplified according to miniaturization and light weight of the portable electronic apparatus. A stainless steel battery can has been initially used as the outer package, but an outer package of an aluminum can has been developed, and currently, a soft outer package of an aluminum laminate package has been also developed. In a case of using the aluminum laminate soft outer package, the outer package is flexible, and accordingly, a space may be formed between an electrode and a separator due to charging and discharging, and this may lead to a technical problem of a short cycle life. In order to solve such a problem, a technology of adhering the electrode and the separator is important and a number of technical proposals have been made.

As one proposal, a technology of using a separator in which a porous layer (hereinafter, also referred to as an adhesive porous layer) formed of a polyvinylidene fluoride type resin is laminated on a polyolefin microporous membrane which is a separator of the related art, has been known (for example, see PTL 3). However, in PTL 3, the polyethylene microporous membrane is mainly used as a porous base material and no specific investigation has been made regarding the improvement of heat resistance of the porous base material.

Meanwhile, PTL 4 discloses a separator in which a heat-resistant porous layer is provided on both surfaces of a porous base material and an adhesive porous layer such as a polyvinylidene fluoride type resin is further provided on the heat-resistant porous layer, and both of heat resistance and adhesiveness with an electrode are realized.

CITATION LIST

Patent Literature

PTL 1: JP-A-2000-30686
PTL 2: JP-T-2012-529742
PTL 3: Japanese Patent No. 4988972
PTL 4: JP-A-2013-20769

SUMMARY OF INVENTION

Technical Problem

However, as in PTL 4, when the adhesive porous layer is further provided on the composite membrane formed of the porous base material and the heat-resistant porous layer, holes in the boundary between the heat-resistant porous layer and the adhesive porous layer may be closed by the adhesive resin and the ionic permeability may be deteriorated. In addition, in PTL 4, there is no concern about a design of a porous structure of the porous base material and the heat-resistant porous layer for preventing a decrease in ionic permeability of the separator in which the adhesive porous layer is formed.

Therefore, the present invention has been made to address the aforementioned problems and provide a non-aqueous-secondary-battery separator which is formed of a composite membrane including a porous base material and a heat-resistant porous layer, has excellent ionic permeability of the composite membrane, and can realize excellent ionic permeability even when an adhesive porous layer is additionally formed on the composite membrane.

Solution to Problem

The invention employs the following configurations in order to solve the above-mentioned problems.

1. A non-aqueous-secondary-battery separator formed of a composite membrane including: a porous base material containing a thermoplastic resin; and a heat-resistant porous layer which is provided on one or both surfaces of the porous base material and containing an organic binder and an inorganic filler, in which the tortuosity rate of the composite membrane is from 1.5 to 2.0.

2. The non-aqueous-secondary-battery separator according to 1, in which the membrane resistance of the composite membrane is equal to or smaller than 5 $\Omega \cdot cm^2$.

3. The non-aqueous-secondary-battery separator according to 1 or 2, in which the difference between the membrane resistance of the composite membrane and the membrane resistance of the porous base material is equal to or smaller than 2 $\Omega \cdot cm^2$.

4. The non-aqueous-secondary-battery separator according to any one of 1 to 3, in which the thermal dimensional change rate of the composite membrane in a longitudinal direction and a width direction, when the composite membrane is heated at least to a flow elongation deformation temperature of the thermoplastic resin at a rate of temperature increase of 5° C./min, is within 3%.

5. The non-aqueous-secondary-battery separator according to any one of 1 to 4, in which the thermal shrinkage of the composite membrane in the longitudinal direction and the width direction, when the composite membrane is subjected to thermal treatment at 150° C. for 30 minutes, is within 3%.

6. The non-aqueous-secondary-battery separator according to any one of 1 to 5, in which the content of the inorganic filler is from 80% by mass to 99% by mass with respect to the total mass of the organic binder and the inorganic filler.

7. The non-aqueous-secondary-battery separator according to any one of 1 to 6, in which the organic binder is a particulate, and the heat-resistant porous layer has a porous structure in which the particulate organic binder and the inorganic filler are connected to each other.

8. The non-aqueous-secondary-battery separator according to any one of 1 to 7, in which the organic binder is one or more kinds of the resin selected from a group consisting of a polyvinylidene fluoride type resin, fluorine rubber, styrene-butadiene rubber, ethylene-acrylate copolymers, carboxymethyl cellulose, hydroxyalkyl cellulose, polyvinyl alcohol, polyvinyl butyral, and polyvinyl pyrrolidone.

9. The non-aqueous-secondary-battery separator according to any one of 1 to 8, in which the inorganic filler is one or more kinds of the filler selected from a group consisting of magnesium hydroxide, magnesium oxide, and magnesium carbonate.

10. The non-aqueous-secondary-battery separator according to any one of 1 to 9, in which an adhesive porous layer containing a polyvinylidene fluoride type resin is further provided on one or both surfaces of the composite membrane.

11. A non-aqueous secondary battery including: a positive electrode; a negative electrode; and the non-aqueous-secondary-battery separator according to any one of 1 to 10 which is disposed between the positive electrode and the negative electrode, in which an electromotive force is obtained by doping and de-doping of lithium.

Advantageous Effects of Invention

According to the invention, it is possible to provide a non-aqueous-secondary-battery separator which is formed of a composite membrane including a porous base material and a heat-resistant porous layer, has excellent ionic permeability of the composite membrane, and can realize excellent ionic permeability even when an adhesive porous layer is additionally formed on the composite membrane.

DESCRIPTION OF EMBODIMENTS

Hereinafter, embodiments of the invention will be sequentially described. The description and examples are merely an example of the invention, and the scope of the invention is not limited. In addition, a numerical range shown with the term "to" in the specification shows a range including numerical values before and after "to" as a minimum value and a maximum value. A "longitudinal direction" of the separator of the invention indicates a long direction of the separator manufactured to have an elongated shape, and a "width direction" thereof indicates a direction orthogonal to the longitudinal direction of the separator. Hereinafter, the "width direction" is also referred to as a "TD direction" and the "longitudinal direction" is also referred to as a "MD direction".

<Non-Aqueous-Secondary-Battery Separator>

There is provided a non-aqueous-secondary-battery separator formed of a composite membrane including a porous base material including a thermoplastic resin and a heat-resistant porous layer which is provided on one or both surfaces of the porous base material and includes an organic binder and an inorganic filler, in which a tortuosity rate of the composite membrane is from 1.5 to 2.0.

Such a separator of the invention has excellent ionic permeability of the composite membrane and can realize excellent ionic permeability even when an adhesive porous layer is additionally formed on the composite membrane. When using the separator of the invention, it is possible to improve battery characteristics such as cycling characteristics or rate characteristics and to provide a battery having excellent safety at a high temperature.

[Porous Base Material]

In the invention, the porous base material indicates a base material having holes or voids therein. Examples of such a base material include a microporous membrane; a porous sheet formed of a fibrous material such as non-woven or paper-like sheet; and the like. The microporous membrane is particularly preferable in order to realize film thinning and high strength of the separator. The microporous membrane indicates a film which includes a plurality of micropores therein, has a structure in which the micropores are connected to each other, and in which air or liquid can pass through one surface to the other surface.

A material configuring the porous base material is a thermoplastic resin and specific examples thereof include polyester such as polyethylene terephthalate; polyolefin such as polyethylene or polypropylene; and the like. Regarding the thermoplastic resin, it is appropriate to use a thermoplastic resin having a flow elongation deformation temperature lower than 200° C., in order to apply a shut-down function to the porous base material. Herein, the shut-down function is a function of blocking the movement of ions by dissolving the thermoplastic resin and closing the holes in the porous base material, and preventing thermal runway of the battery, when the battery temperature is increased.

Herein, the flow elongation deformation temperature of the thermoplastic resin indicates a temperature at which flow elongation deformation is significant by a load, when contraction and elongation are measured with constant load conditions at a constant rate of temperature increase. For example, the porous base material formed of the thermoplastic resin is cut out to have a size of a width of 3 mm×a length of 16 mm along the MD direction and the TD direction, and thermomechanical analysis (TMA) is performed under conditions of a rate of temperature increase of 5° C./min, in a state where one end of the sample in the longitudinal direction is grasped and a load is applied to the other end thereof with an application load of 19.6 mN. Accordingly, a TMA chart of the MD direction and the TD direction in which the temperatures are plotted on a horizontal axis and the sample lengths at each temperature are plotted on a vertical axis is obtained. An average of the temperatures at which the elongation is 15% in the TMA chart of the MD direction and the TD direction is calculated and this can be defined as the flow elongation deformation temperature.

Among these, it is preferable to use a polyolefin microporous membrane including polyolefin as the porous base material. As the polyolefin microporous membrane, a polyolefin microporous membrane having sufficient mechanical properties and ionic permeability may be selected from the polyolefin microporous membranes used in the non-aqueous-secondary-battery separator of the related art. The polyolefin microporous membrane preferably contains polyethylene and preferably has the content of polyethylene equal to or greater than 95% by mass, in order to realize the shut-down function described above.

In addition, the polyolefin microporous membrane containing polyethylene and polypropylene is preferable, in order to apply heat resistance so as not to be easily broken when the membrane is exposed to a high temperature. As such a polyolefin microporous membrane, a microporous membrane in which polyethylene and polypropylene are mixed in one layer is used. The microporous membrane preferably contains equal to or greater than 95% by mass of polyethylene and equal to or smaller than 5% by mass of polypropylene, in order to satisfy both the shut-down function and heat resistance. In order to satisfy both the shut-down function and heat resistance, it is also preferable to use the polyolefin microporous membrane which has a laminate structure of two layers or more, and has a structure in which at least one layer contains polyethylene and at least one layer contains polypropylene.

A weight average molecular weight (Mw) of polyolefin contained in the polyolefin microporous membrane is preferably from 100,000 to 5,000,000. When the weight average molecular weight is equal to or greater than 100,000, it is possible to ensure sufficient mechanical properties. Meanwhile, when the weight average molecular weight is equal to or smaller than 5,000,000, an excellent shut-down function is obtained and the membrane is easily formed.

The polyolefin microporous membrane can be manufactured with the following method, for example. That is, a method of forming a microporous membrane by sequentially executing (i) a step of extruding and sheeting a melted polyolefin resin from a T-die, (ii) a step of performing a crystallization process with respect to the sheet, (iii) a step of stretching the sheet, and (iv) a step of performing thermal treatment of the sheet is used.

In addition, a method of forming a microporous membrane by sequentially executing (i) a step of melting the polyolefin resin with a plasticizer such as liquid paraffin and extruding this from a T-die, and cooling and sheeting this, (ii) a step of stretching the sheet, (iii) a step of extracting the plasticizer from the sheet, and (iv) a step of performing thermal treatment of the sheet is also used.

As the porous sheet formed of a fibrous material, a porous sheet such as non-woven fabric or paper formed of a fibrous material of a thermoplastic resin is used.

In the invention, a film thickness of the porous base material is preferably from 3 µm to 25 µm, in order to obtain excellent mechanical properties and internal resistance.

A Gurley value (JIS P8117) of the porous base material is preferably in a range of 50 sec/100 cc to 400 sec/100 cc, in order to prevent short circuit of the battery and to obtain sufficient ionic permeability.

A porosity of the porous base material is preferably from 20% to 60%, in order to obtain appropriate membrane resistance and shut-down function.

A piercing strength of the porous base material is preferably equal to or greater than 300 g, in order to improve the manufacturing yield.

Various surface treatments can be performed for the porous base material, in order to improve wettability of a coating solution containing an organic binder and an inorganic filler which will be described later. Specific examples of the surface treatment include a corona treatment, a plasma treatment, a flame treatment, and an ultraviolet irradiation treatment, and the treatment can be performed in a range not deteriorating the properties of the porous base material.

[Heat-Resistant Porous Layer]

The heat-resistant porous layer of the invention is provided on one or both surfaces of the porous base material and contains the organic binder and the inorganic filler.

Examples of the structure of such a heat-resistant porous layer include (A) a microporous-membrane-shape and (B) a porous structure in which particulate organic binder and inorganic filler are connected to each other. Herein, heat resistance indicates a property of not being melted or decomposed in a temperature range lower than 150° C.

In a case of the (A) microporous membrane shape, the inorganic filler and the organic binder are included, a plurality of micropores are included therein, the micropores are connected to each other, and air or liquid can pass through one surface to the other surface.

The porous structure in which the (B) particulate organic binder and inorganic filler are connected to each other is preferable, in order to have excellent ionic permeability and heat resistance and improve productivity of the separator. Herein, such a porous structure means that the organic binder particles are fixed to the porous base material, the organic binder particles adjacent to each other or the organic binder particles and the inorganic fillers are connected to each other, holes between the particles are formed, and the entire aggregate of the organic binder particles and the inorganic filler has the porous structure.

(Organic Binder)

In the invention, the organic binder is not particularly limited, but it is necessary to use an organic binder which is stable with respect to an electrolyte, has electrochemical stability, and has a function of connecting the inorganic filler.

When the heat-resistant porous layer is the (A) microporous membrane shape, and the content of the inorganic filler is comparatively small, for example, a three-dimensional network structure in which the organic binder has a fibrillar shape is configured and the fillers are present in this network in a supplemented state. Meanwhile, when the content of the inorganic filler is comparatively large, the organic binder is attached to at least apart of the surface of the inorganic filler to connect the inorganic fillers, and the voids are formed between the inorganic fillers.

As in a case of (B), when the heat-resistant porous layer has a porous structure in which the particulate organic binder and the inorganic filler are connected to each other, the particulate organic binder is present to be dispersed in the heat-resistant porous layer in a particle unit.

Specific examples of the organic binder include one or more kinds of resins selected from a group consisting of a polyvinylidene fluoride type resin, fluorine rubber, styrene-butadiene rubber, ethylene-acrylate copolymers, carboxymethyl cellulose, hydroxyalkyl cellulose, polyvinyl alcohol, polyvinyl butyral, and polyvinyl pyrrolidone. A polyvinylidene fluoride type resin, fluorine rubber, or styrene-butadiene rubber is preferably used, in order to decrease moisture content of the separator.

Among these, the polyvinylidene fluoride type resin is preferable. Examples of the polyvinylidene fluoride type resin include a homopolymer of vinylidene fluoride, that is, polyvinylidene fluoride, a copolymer of vinylidene fluoride and another monomer which can be copolymerized with the vinylidene fluoride, a mixture of polyvinylidene fluoride and an acrylic polymer, and a mixture of a polyvinylidene fluoride copolymer and an acrylic polymer.

The monomer which can be copolymerized with the vinylidene fluoride is not particularly limited, and examples thereof include vinyl fluoride, chlorotrifluoroethylene, tetrafluoroethylene, hexafluoropropylene, trifluoroethylene, trichloroethylene, trifluoroperfluoropropyl ether, ethylene, (meth)acrylic esters such as (meth)acrylic acid, methyl (meth)acrylate, or ethyl (meth)acrylate, vinyl acetate, vinyl chloride, and acrylonitrile. These can be used alone or in combination of two or more kinds. (Meth)acryl means acryl or methacryl.

The acrylic polymer is not particularly limited, and examples thereof include polyacrylic acid, polyacrylate, ester polyacrylate, cross-linked polyacrylic acid, crosslinked polyacrylate, cross-linked ester polyacrylate, ester polymethacrylate, cross-linked polymethacrylic acid, cross-linked polymethacrylate, and cross-linked ester polymethacrylate, and a modified acrylic polymer can be used. These can be used alone or in combination of two or more kinds. Particularly, polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic polymer, or a mixture of a polyvinylidene fluoride copolymer and an acrylic polymer is preferable.

The polyvinylidene fluoride copolymer is preferably a copolymer having a vinylidene fluoride-derived constituent unit of 50% by mol or more with respect to the entire constituent units, as a constituent unit. By containing the polyvinylidene fluoride type resin having content of vinylidene fluoride equal to or greater than 50% by mol, it is possible to ensure sufficient mechanical properties of an adhesive layer, even after the separator and the electrode are subjected to pressure bonding or hot pressing in a state where the separator and the electrode are overlapped.

Regarding the mixture of polyvinylidene fluoride and an acrylic polymer or the mixture of a polyvinylidene fluoride copolymer and an acrylic polymer, it is preferable to contain equal to or greater than 20% by mass of polyvinylidene fluoride or the vinylidene fluoride copoolymer in viewpoint of oxidation resistance.

When the organic binder is particulate, an average particle diameter of the particulate organic binders is preferably from 0.01 µm to 1 µm, more preferably from 0.02 µm to 1 µm, and particularly preferably from 0.05 µm to 1 µm, in view of handling ability or manufacturability.

(Inorganic Filler)

In the invention, the inorganic filler is not particularly limited, as long as it is stable with respect to an electrolyte and has electrochemical stability. Specific examples thereof include metal hydroxide such as aluminum hydroxide, magnesium hydroxide, calcium hydroxide, chromium hydroxide, zirconium hydroxide, cerium hydroxide, nickel hydroxide, or boron hydroxide; metal oxide such as alumina, zirconia, or magnesium oxide; carbonate such as calcium carbonate or magnesium carbonate; sulfate such as barium sulfate or calcium sulfate; and clay mineral such as calcium silicate or talc. Among these, it is preferable to be formed of at least one of metal hydroxide and metal oxide. It is particularly preferable to use metal hydroxide in order to impart flame resistance and obtain a discharging effect. The various fillers may be used alone or in combination or two or more kinds. Among the elements described above, in order to suppress an reaction with an electrolyte and prevent gas generation, it is preferable to use one or more kinds of filler (hereinafter, magnesium filler) selected from a group consisting of magnesium hydroxide, magnesium oxide, and magnesium carbonate. In addition, it is possible to use an inorganic filler subjected to surface modification by a silane coupling agent.

An average particle diameter of the inorganic fillers is preferably from 0.01 µm to 10 µm. A lower limit thereof is more preferably equal to or greater than 0.1 µm and an upper limit thereof is more preferably equal to or smaller than 5 µm.

Particle size distribution of the inorganic fillers is preferably $0.1<d90-d10<3$ µm. Herein, d10 indicates an average particle diameter (µm) when the cumulative percentage calculated from the side of the smallest particle becomes 10% by mass, and d90 indicates an average particle diameter (µm) when the cumulative percentage becomes 90% by mass, in the particle size distribution in a laser diffraction system. As the measurement of the particle size distribution, a method of using water as a dispersion medium and a small amount of a nonionic surfactant Triton X-100 as a dispersant, using a laser diffraction-type particle size distribution measuring device (Mastersizer 2000 manufactured by Sysmex Corporation) is used.

The shape of the inorganic filler may be a shape close to a spherical shape or a plate shape, for example, but the plate-shaped particles or primary particles not aggregated are preferable in order to prevent short circuit.

(Thickener)

The heat-resistant porous layer of the invention may further include a thickener. By containing the thickener, it is possible to improve dispersibility of the particles or fillers.

Examples of the thickener include cellulose and/or cellulose salt, a resin such as polyvinyl alcohol, polyvinyl butyral, polyvinyl pyrrolidone, polyethylene glycol, polypropylene glycol, polyacrylic acid, higher alcohols and salt thereof. Among these, cellulose and/or cellulose salt are preferable. Cellulose and/or cellulose salt are not particularly limited, and examples thereof include carboxymethyl cellulose, hydroxyethyl cellulose, hydroxypropyl cellulose, methyl cellulose and sodium salt thereof, and ammonium salt.

In the invention, mass of the thickener with respect to the total mass of the organic binder, the inorganic filler, and the thickener is preferably equal to or smaller than 10% by mass and more preferably equal to or smaller than 5% by mass. When the content of the thickener is equal to or smaller than 10% by mass, excellent thermal dimensional stability and air permeability are obtained.

(Other Additives)

If necessary, additives formed of other inorganic compounds or organic compounds can be additionally added to the heat-resistant porous layer of the invention, in a range not degrading the effects of the invention. In this case, the porous layer can have a configuration in which equal to or more than 90% by mass of the entire layer is configured with the organic binder and the inorganic filler and additives are contained as remainders.

The heat-resistant porous layer of the invention may contain a dispersant such as a surfactant, and it is possible to improve dispersibility, coating properties, and storage stability. Various additives such as a wetting agent for obtaining excellent adaptability with the porous base material, a antifoaming agent for preventing air entrainment into a coating solution, and a pH adjuster containing acid or alkali may be contained in the heat-resistant porous layer of the invention. The additives may remain as long as those have electrochemical stability and do not disturb the reaction in the battery in a usage range of the lithium ion secondary battery.

(Various Physical Properties of Heat-resistant Porous Layer)

In the invention, the content of the inorganic filler in the heat-resistant porous layer is preferably from 80% by mass to 99% by mass with respect to the total mass of the organic binder and the inorganic filler. When the content of the inorganic filler is equal to or greater than 80% by mass, excellent thermal dimensional stability and air permeability are obtained. In such a viewpoint, the content of the inorganic filler is preferably equal to or greater than 85% by mass and more preferably equal to or greater than 90% by mass. When the content of the inorganic filler is equal to or smaller than 99% by mass, it is possible to prevent powder falling of the inorganic filler or peeling of the porous layer and to expect excellent thermal dimensional stability. In such a viewpoint, the content of the inorganic filler is preferably equal to or smaller than 98.5% by mass and more preferably equal to or smaller than 98% by mass.

The heat-resistant porous layer may be laminated on one or both surfaces of the porous base material, and this is advantageous in both cases. That is, when the heat-resistant porous layer is laminated on only one surface of the porous base material, it is possible to decrease the film thickness of the entire separator, and accordingly, it is possible to contribute to improvement of battery capacity and excellent ionic permeability is obtained with the small number of laminated layers. Meanwhile, when the heat-resistant porous layer is laminated on both surfaces of the porous base material, heat resistance is further improved, excellent safety of the battery is obtained at a high temperature, and a symmetrical structure is obtained, and it is possible to prevent curling.

A thickness of one surface of the heat-resistant porous layer is preferably from 0.5 μm to 10 μm, in viewpoints of heat resistance, handling ability, and battery capacity. When forming the heat-resistant porous layer on both surfaces of the porous base material, the total of the film thicknesses of two porous layers is preferably from 1 μm to 20 μm.

A porosity of the heat-resistant porous layer is preferably from 40% to 70% and more preferably from 45% to 65%, in order to obtain excellent heat resistance and ionic permeability.

[Various Physical Properties of Composite Membrane]

In the invention, it is important that a tortuosity rate of the composite membrane including the porous base material and the heat-resistant porous layer is from 1.5 to 2.0. Herein, the tortuosity rate is acquired by the following equation.

$$\tau = \{(Rm \cdot \varepsilon)/(\rho \cdot t)\}^{1/2}$$

In the equation described above, τ represents a tortuosity rate, Rm represents membrane resistance (ohm·cm$^2$), ε represents a porosity (%), ρ represents specific resistance (ohm·cm) of electrolyte, and t represents a film thickness (μm). In the invention, the membrane resistance is measured using 1M of LiBF$_4$ propylene carbonate/ethylene carbonate (1/1 mass ratio) in an electrolyte at 20° C., and ρ in this case is 2.663×10$^2$ ohm·cm$^2$.

When the tortuosity rate of the composite membrane is equal to or smaller than 2.0, excellent ion permeability of the composite membrane is obtained. Even when an adhesive porous layer is additionally laminated on the composite membrane, excellent ion permeability is obtained. In such a viewpoint, the tortuosity rate of the composite membrane is preferably equal to or smaller than 1.95 and more preferably equal to or smaller than 1.9. Meanwhile, when the tortuosity rate of the composite membrane is equal to or greater than 1.5, it is possible to prevent generation of lithium dendrite, to prevent intrusion of the adhesive porous layer into the heat-resistant porous layer of the composite membrane, and to prevent a decrease in ionic permeability. In such a viewpoint, the tortuosity rate of the composite membrane is preferably equal to or greater than 1.6 and more preferably equal to or greater than 1.7.

A method of controlling the tortuosity rate of the composite membrane is not particularly limited, and the tortuosity rate can be controlled by kinds of the porous base material, kinds of the organic binder, kinds of the inorganic filler, a size of the inorganic filler, a composition ratio of the organic binder and the inorganic filler, a coating thickness, and a drying method, or a solvent used in slurry.

In the invention, the membrane resistance of the composite membrane is preferably equal to or smaller than 5 Ω·cm$^2$. When the membrane resistance of the composite membrane is equal to or smaller than 5 Ω·cm$^2$, excellent ionic permeability is obtained and it is possible to improve battery characteristics such as rate characteristics.

A difference between the membrane resistance of the composite membrane and the membrane resistance of the porous base material is preferably equal to or smaller than 2 Ω·cm$^2$. In such a configuration, it is possible to sufficiently prevent a decrease in ionic permeability even when the heat-resistant porous layer is formed, and to realize excellent ionic permeability.

A method of controlling the membrane resistance of the composite membrane is not particularly limited, and the membrane resistance can be controlled by kinds of the porous base material, kinds of the organic binder, kinds of the inorganic filler, a size of the inorganic filler, a composition ratio of the organic binder and the inorganic filler, a coating thickness, and a drying method, or a solvent used in slurry.

In the invention, regarding the composite membrane including the porous base material and the heat-resistant porous layer, a thermal dimensional change rate of the longitudinal direction (MD direction) and the width direction (TD direction) of the composite membrane, when the composite membrane is heated at least to the flow elongation deformation temperature of the thermoplastic resin at a rate of temperature increase of 5° C./min, is preferably within 3%.

Herein, when measuring the thermal dimensional change rate, first, the composite membrane is cut out to have a size of a width of 3 mm×a length of 16 mm along the MD direction and the TD direction, and thermomechanical analysis (TMA) is performed under conditions of a rate of temperature increase of 5° C./min, in a state where one end of the sample in the longitudinal direction is grasped and a load is applied to the other end thereof with an application load of 19.6 mN. Accordingly, a TMA chart in which the temperatures are plotted on a horizontal axis and the sample lengths at each temperature are plotted on a vertical axis is obtained. By subtracting the length of the sample at each temperature to the flow elongation deformation temperature of the thermoplastic resin from the sample length before the heating, the changed amount of the length of the composite membrane in the MD direction or the TD direction from the temperature before the heating to the flow elongation deformation temperature of the thermoplastic resin is obtained. A maximum changed amount as an absolute value is a "maximum changed amount". The thermal dimensional change rate can be acquired by the following equation.

(Thermal dimensional change rate (%))=(maximum changed amount of composite membrane)/(length of composite membrane before heating)×100

When the thermal dimensional change rate in the MD direction is within 3%, even when a battery temperature gradually increases from a room temperature when manufacturing the battery by winding the separator and the electrode in the longitudinal direction, the separator is not substantially expanded or contracted in the MD direction to the flow elongation deformation temperature of the porous base material, and accordingly, it is possible to apply stable heat resistance to a high degree. In such a viewpoint, the thermal dimensional change rate in the MD direction is preferably within 3% and more preferably within 2%.

When the thermal dimensional change rate in the TD direction is within 3%, and the separator and the electrode are overlapped with each other to manufacture a cylindrical battery, a square battery, or a laminate battery, it is possible to prevent deformation of the separator in the TD direction when the battery temperature gradually increases, and it is possible to apply more excellent heat resistance. It is not necessary to adjust the width of the separator by expecting the thermal deformation of the separator in the TD direction and it is possible to contribute to the improvement of the battery capacity. In such a viewpoint, the thermal dimensional change rate in the TD direction is preferably within 3% and more preferably within 2%.

In the invention, regarding the composite membrane including the heat-resistant porous base material and the porous layer, a thermal shrinkage of the composite membrane in the longitudinal direction (MD direction) and the width direction (TD direction), when the composite membrane is subjected to thermal treatment at 150° C. for 30 minutes, is preferably within 3%. Herein, when measuring the thermal shrinkage, first, the separator which is a sample is cut out to have a size of 18 cm (MD direction)×6 cm (TD direction). Marks are attached on a line bisecting the length in the TD direction, at portions (point A and point B) 2 cm and 17 cm from the top. In addition, marks are attached on a line bisecting the length in the MD direction, at portions (point C and point D) 1 cm and 5 cm from the left. The sample is clipped (a portion to be clipped is a portion within 2 cm from the top in the MD direction) and is suspended in an oven having a temperature adjusted to 150° C., and the thermal treatment is performed for 30 minutes under tensionless conditions. The lengths between two points A and B and two points C and D are measured before and after the thermal treatment, and the thermal shrinkage is acquired from the following equation.

MD direction thermal shrinkage={(length between $A$ and $B$ before thermal treatment−length between $A$ and $B$ after thermal treatment)/length between $A$ and $B$ before thermal treatment}×100

TD direction thermal shrinkage={(length between $C$ and $D$ before thermal treatment−length between $C$ and $D$ after thermal treatment)/length between $C$ and $D$ before thermal treatment}×100

When the thermal shrinkage in the MD direction and the TD direction is within 3% and the battery is manufactured, for example, the short circuit hardly occurs even when the battery is exposed at a high temperature, and it is possible to apply stable heat resistance to a high degree. In such a viewpoint, the thermal shrinkage in the MD direction and the TD direction is preferably within 3% and more preferably within 2%.

In the invention, an amount of water included in the composite membrane is preferably equal to or smaller than 3000 ppm. As the amount of water of the composite membrane is small, it is possible to prevent the reaction between the electrolyte and water when the battery is manufactured and it is possible to prevent generation of gas in the battery. In such a viewpoint, the amount of water included in the composite membrane is more preferably equal to or smaller than 2500 ppm and even more preferably equal to or smaller than 2000 ppm. A method of controlling the amount of water in the composite membrane is not particularly limited, and an organic binder to be used, kinds of the thickener or the inorganic filler, or drying conditions for manufacturing the composite membrane are used. For preventing the gas generation in the battery, in addition to the adjustment of the amount of water described above, it is also effective to use magnesium filler as the inorganic filler and to use a hydrophobic resin as the organic binder.

In the invention, a Gurley value of the composite membrane is preferably equal to or smaller than 400 sec/100 cc, in a viewpoint of ionic permeability. The film thickness of the composite membrane is preferably equal to or smaller than 30 μm and more preferably equal to or smaller than 25 μm, in viewpoints of energy density and output characteristics of the battery. The piercing strength of the composite membrane is preferably from 300 g to 1000 g and more preferably from 300 g to 600 g.

<Manufacturing Method of Non-Aqueous-Secondary-Battery Separator>

In the invention, a manufacturing method of the non-aqueous-secondary-battery separator is not particularly limited, and it is possible to manufacture the non-aqueous-secondary-battery separator by the following method 1 or 2, for example.

(Method 1)

A method 1 is a method of forming the heat-resistant porous layer having the (A) microporous membrane shape. This method 1 includes the following steps of A1 to A5.

A1: Preparation Step of Slurry

A resin binder is melted in a solvent and the filler is dispersed in this solvent to prepare slurry for coating. The solvent is not particularly limited as long as it dissolves the resin binder. A polar solvent is preferable and examples thereof include dimethyl sulfoxide, N,N-dimethylformamide, N,N-dimethylacetamide, and N-methyl-2-pyrrolidone. For the solvent, a solvent which is a poor solvent with respect to the resin can also be added, in addition to the polar solvent. A microphase-separated structure is introduced by applying such a poor solvent and it is easy to realize a porous state when forming the heat-resistant porous layer. As the poor solvent, alcohols are preferable and polyalcohol such as glycol is particularly preferable. Concentration of the resin in the slurry for coating is preferably from 4% by mass to 9% by mass. When using the inorganic filler as the filler and the dispersibility of the inorganic filler is not good, a method of performing the surface treatment of the inorganic filler with a silane coupling agent or the like to improve the dispersibility can also be applied.

A2: Coating Step

The slurry is coated on one or both surfaces of the porous base material. It is preferable to coat the slurry on both surfaces of the base material at the same time, in order to shorten the step. Examples of a method of coating the slurry for coating include a knife coater method, a gravure coater method, a Mayer bar method, a die coater method, a reverse roll coater method, a roll coater method, a screen printing method, an ink jet method, and a spray method. Among these, the reverse roll coater method is preferable in order to uniformly form a coated layer.

A3: Congealing Step

The coated film after the coating is subjected to a process with congealed liquid and the heat-resistant porous layer is formed. Examples of a method of performing the process with the congealed liquid include a method of spraying the congealed liquid to the surface coated with the slurry for coating with a sprayer, and a method of immersing the porous base material coated with the slurry for coating in a bath (congealing bath) including the congealed liquid. The congealed liquid is not particularly limited as long as it can congeal the resin binder, and water or a mixture obtained by adding an appropriate amount of water to the solvent used for the slurry is preferable. Herein, the mixing amount of water is preferably from 40% by mass to 80% by mass with respect to the congealed liquid, in a viewpoint of a congealing effect and a porous state.

A4: Water Washing Step

The coated film after the congealing is washed with water and accordingly the congealed liquid in the coated film is removed.

A5: Drying Step

The coated film after water washing is dried to remove moisture. A drying method is not particularly limited, but a drying temperature is preferably from 50° C. to 80° C. In a case of applying a high drying temperature, it is preferable to use a method of bringing the coated film to come in contact with a roll, in order to not cause dimensional change due to thermal contraction.

Others

The method described above is an excellent method in order to form the heat-resistant porous layer directly on the porous base material, but the invention is not limited thereto. For example, in the method described above, the heat-resistant porous layer is formed using a mold releasing film instead of the porous base material, the dried heat-resistant porous layer is peeled off from the mold releasing film, and a sheet of the heat-resistant porous layer alone is formed. In addition, a method of adhering the sheet of the heat-resistant porous layer on the base material with an adhesive or a method of performing heat sealing or pressure bonding can be used.

(Method 2)

A method 2 is a method of forming a porous structure in which the particulate organic binder and inorganic filler are connected to each other as (B) described above. This method 2 includes the following steps of B1 to B3.

B1: Preparation Step of Slurry

Each of the particulate organic binder and inorganic filler is dispersed, suspended, or emulsified in a solvent in a solid state, to prepare slurry. In this case, the slurry may be emulsion or suspension. As the solvent, at least water is used, and a solvent other than water may be used. The solvent other than water is not particularly limited, and examples thereof include alcohol such as methanol, ethanol, or 2-propanol, an organic solvent such as acetone, tetrahydrofuran, methyl ethyl ketone, ethyl acetate, N-methylpyrrolidone, dimethylacetamide, dimethylformamide, or dimethylformamide. It is preferable to use water or an aqueous emulsion obtained by dispersing the organic binder particles and the inorganic filler in a mixture of water and alcohol, in a viewpoint of manufacturability or environment protection. A well-known thickener may be further contained in a range of ensuring an appropriate viscosity in coating. A well-known surfactant may be contained in order to improve dispersibility of the organic binder particles and the inorganic filler.

The content of the organic binder particles in the slurry is preferably from 1% by mass to 10% by mass. The content of the inorganic filler in the slurry is preferably from 1% by mass to 50% by mass.

B2: Coating Step

For the coating step, the same step as A2 described above can be employed.

B3: Drying Step

The coated film after the coating is dried to remove the solvent, and the heat-resistant porous layer in which the organic binder particles and the inorganic filler are connected to each other is formed. The organic binder particles in the heat-resistant porous layer obtained through the drying step preferably have particulate shape. By performing the drying step, the organic binder particles function as a binder and the entire heat-resistant porous layer is integrally formed on the porous base material.

<Adhesive Porous Layer>

In the invention, it is possible to further provide the adhesive porous layer including the polyvinylidene fluoride type resin on one or both surfaces of the composite membrane including the porous base material and the heat-resistant porous layer. By providing such an adhesive porous layer, it is possible to obtain adhesiveness between the electrode and the separator, in addition to the ionic permeability and heat resistance described above. Particularly, in the invention, by adjusting the tortuosity rate of the composite membrane including the porous base material and the heat-resistant porous layer from 1.5 to 2.0, it is possible to ensure the excellent ionic permeability even in a case of a composite separator in which the adhesive porous layer is formed in the composite membrane.

The adhesive porous layer is not particularly limited as long as it is a porous layer including the polyvinylidene fluoride type resin, and a microporous membrane-shaped layer is used, for example. Herein, the microporous membrane-shaped layer is a layer which includes a plurality of micropores therein and has a structure in which the micropores are connected to each other, and in which air or liquid passes one surface to the other surface.

As the polyvinylidene fluoride type resin, it is possible to use the same material as the polyvinylidene fluoride type resin of the heat-resistant porous layer described above.

The porosity of the adhesive porous layer is preferably from 30% to 70% in a viewpoint of the ionic permeability. The thickness of one surface of the adhesive porous layer is preferably from 0.5 μm to 10 μm in a viewpoint of the adhesiveness with the electrode and the ionic permeability. The coating amount of the adhesive resin of the adhesive porous layer is preferably in a range of 0.5 g/m$^2$ to 3.5 g/m$^2$ in total of both surfaces.

In the invention, a forming method of the adhesive porous layer is not particularly limited, and it is possible to form the adhesive porous layer in the same manner as in the method 1 of the forming method of the heat-resistant porous layer described above. Specifically, in the preparation step of the slurry A1 in the method 1, the polyvinylidene fluoride type resin is melted in a solvent, filler or additives are added to this, if necessary, and slurry for coating is prepared. It is possible to use the steps A2 to A5 for the subsequent steps in the same manner as described above.

<Non-aqueous Secondary Battery>

A non-aqueous secondary battery of the invention includes the separator of the invention described above.

Specifically, the non-aqueous secondary battery of the invention includes a positive electrode, a negative electrode, and the non-aqueous-secondary-battery separator of the invention disposed between the positive electrode and the negative electrode, and obtains an electromotive force by doping and de-doping of lithium.

In the invention, in the non-aqueous secondary battery, the separator is disposed between the positive electrode and the negative electrode and these battery elements are enclosed in an outer package with the electrolyte. As the non-aqueous secondary battery, a lithium ion secondary battery is suitable. The doping means occlusion, support, adsorption, or insertion and means a phenomenon in which lithium ions enter an active material of the electrode such as a positive electrode.

The positive electrode may have a structure in which an active material layer including a positive electrode active material and a binder resin is formed on a current collector. The active material layer may further include a conductive assistant. As the positive electrode active material, lithium-containing transition metal oxide is used, for example, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. As the binder resin, the polyvinylidene fluoride type resin is used, for example. As the conductive assistant, a carbon material such as acetylene black, Ketchen black, or graphite powder is used, for example. As the current collector, an aluminum foil, a titanium foil, or a stainless steel foil having a thickness of 5 μm to 20 μm is used, for example.

In the non-aqueous secondary battery of the invention, when the heat-resistant porous layer or the adhesive porous layer of the separator is disposed on the positive electrode side, the layer has excellent oxidation resistance, and accordingly, the positive electrode active material such as $LiMn_{1/2}Ni_{1/2}O_2$ or $LiCo_{1/3}Mn_{1/3}Ni_{1/3}O_2$ which can act at high pressure equal to or greater than 4.2 V can be easily applied.

The negative electrode may have a structure in which an active material layer including a negative electrode active material and a binder resin is formed on a current collector. The active material layer may further include a conductive assistant. As the negative electrode active material, a material which can be electrochemically occlude lithium is used, and specific examples thereof include a carbon material; an alloy of silicon, tin, or aluminum and lithium; and the like. As the binder resin, a polyvinylidene fluoride type resin or styrene-butadiene rubber is used, for example. As the conductive assistant, a carbon material such as acetylene black, Ketchen black, or graphite powder is used, for example. As the current collector, a copper foil, a nickel foil, or a stainless steel foil having a thickness of 5 μm to 20 μm is used, for example. In addition, a metal lithium foil may be used as the negative electrode, instead of the negative electrode described above.

The electrolyte is a solution obtained by dissolving lithium salt in a non-aqueous solvent. Examples of lithium salt include $LiPF_6$, $LiBF_4$, $LiClO_4$, and the like. Examples of the non-aqueous solvent include cyclic carbonate such as ethylene carbonate, propylene carbonate, fluoroethylene carbonate, or difluoroethylene carbonate; chain-shape carbonate such as dimethyl carbonate, diethyl carbonate, ethyl methyl carbonate, and a fluorine-substituted compound thereof; and cyclic ester such as γ-butyrolactone, or γ-valerolactone, and these may be used alone or in combination thereof. As the electrolyte, it is preferable to mix cyclic carbonate and chain-shaped carbonate at a mass ratio (cyclic carbonate/chain-shaped carbonate) of 20/80 to 40/60 and dissolve lithium salt to be 0.5 M to 1.5 M.

As an outer package, a metal can or an aluminum laminate film-made package is used. Examples of the shape of the battery include a square shape, a cylindrical shape, or a coin shape, and the separator of the invention is suitable in any shape.

The non-aqueous secondary battery of the invention, for example, can be manufactured by impregnating a laminate including the separator of the invention disposed between the positive electrode and the negative electrode with the electrolyte, accommodating the laminate in an outer package (for example, aluminum laminate film-made package), and pressing the laminate from the top of the outer package.

A method of disposing the separator between the positive electrode and the negative electrode may be a method of laminating the positive electrode, the separator, and the negative electrode at least one by one in this order (a so-called stacking method), or may be a method of overlapping the positive electrode, the separator, the negative electrode, and the separator in this order and winding those in a longitudinal direction.

EXAMPLES

Hereinafter, the invention will be described with reference to the examples. Herein, the invention is not limited to the following examples.

[Measurement Method]

Hereinafter, a measurement method used in the example of the invention will be described.

(Film Thickness)

The film thickness was measured using a contact-type thickness meter (LITEMATIC manufactured by Mitutoyo). A cylindrical measurement terminal having a diameter of 5 mm was used, the adjustment was performed by applying load of 7 g during the measurement, and an average value of the thickness at 20 points was acquired.

(Weight Per Area)

A sample was cut out to have a size of 10 cm×30 cm and the mass thereof was measured. The mass is divided by the area to acquire the weight per area.

(Coating Amount)

After acquiring total mass of the heat-resistant porous layer by subtracting the weigh per area of the porous base material from the weight per area of the separator, the masses of the organic binder and the inorganic filler were calculated from the charged amount.

(Porosity)

When constituent materials are formed as a, b, c, . . . , n, the mass of the constituent materials is set as Wa, Wb, Wc, . . . , Wn ($g/cm^2$), real density thereof is set as da, db, dc, . . . , dn ($g/cm^3$), and the film thickness of the focused layer is set as t(cm), the porosity ε(%) was acquired by the following equation.

$$\varepsilon = \{1-(Wa/da+Wb/db+Wc/dc+\ldots+Wn/dn)/t\}\times 100$$

(Membrane Resistance)

A sample was cut to have a size of 2.6 cm×2.0 cm. The cut-out sample was immersed into a methanol solution obtained by dissolving 3% by mass of a nonionic surfactant (EMULGEN 210P manufactured by Kao Corporation), and then the sample was dried with air. The aluminum foil having a thickness of 20 μm was cut to have a size of 2.0 cm×1.4 cm and a lead tab was attached to this. Two sheets of this aluminum foil were prepared, and the cut-out separator was interposed between the aluminum foil sheets so that short circuit of the aluminum foil does not occur. Liquid obtained by dissolving 1M of $LiBF_4$ in a solvent obtained by mixing propylene carbonate and ethylene carbonate at a mass ratio of 1:1 is used as an electrolyte, and the sample was impregnated with this electrolyte. This was enclosed in the aluminum laminate package at reduced pressure, so that the tab is exposed to the outside of the aluminum package. Such cell was prepared so that the number of samples of the aluminum foil is 1, 2, and 3. The cell was added into a thermostat at 20° C., and resistance of the cell was measured at amplitude of 10 mV and a frequency of 100 kHz by an AC impedance method. The measured resistance value of the cell was plotted with respect to the number of samples, and this plot was set to be substantially linear, and the inclination thereof was acquired. 2.0 cm×1.4 cm which is an electrode area was multiplied by this inclination, and membrane resistance (ohm·cm$^2$) per separator was acquired. This membrane resistance is an index of ionic permeability, and as the membrane resistance is low, it is possible to determine that the excellent ionic permeability is obtained.

(Gurley Value)

The Gurley value of the separator was measured by Gurley-type densometer (G-B2C manufactured by TOYO SEIKI SEISAKU-SHO, LTD.) based on JIS P8117.

(Tortuosity Rate)

Regarding the separator which is a sample, the membrane resistance and the porosity were measured by the method described above, and the tortuosity rate τ was calculated by the following equation.

$$\tau = \{(Rm \cdot \varepsilon)/(\rho \cdot t)\}^{1/2}$$

Herein, Rm represents membrane resistance (ohm·cm$^2$), ε represents a porosity (%), ρ represents specific resistance (ohm·cm) of electrolyte, and t represents a film thickness (μm). In the invention, 1M of LiBF$_4$ propylene carbonate/ethylene carbonate (1/1 mass ratio) is used as an electrolyte at 20° C., and ρ in this case is 2.663×10$^2$ ohm·cm.

(Flow Elongation Deformation Temperature)

Regarding the flow elongation deformation temperature of the thermoplastic resin, the porous base material formed of the thermoplastic resin is cut out to have a size of a width of 3 mm×a length of 16 mm along the MD direction and the TD direction, and thermomechanical analysis (TMA) is performed under conditions of a rate of temperature increase of 5° C./min, in a state where one end of the sample in the longitudinal direction is grasped and a load is applied to the other end thereof with an application load of 19.6 mN. Accordingly, a TMA chart of the MD direction and the TD direction in which the temperatures are plotted on a horizontal axis and the sample lengths at each temperature are plotted on a vertical axis is obtained. An average of the temperatures at which the elongation is 15% in the TMA chart of the MD direction and the TD direction was calculated.

Example 1

A coating solution (aqueous dispersion material) having 24.8% by mass of solid content concentration was prepared by uniformly dispersing aqueous emulsion containing fine particles containing a polyvinylidene fluoride type resin, magnesium hydroxide having an average particle diameter of 880 nm, carboxymethyl cellulose (CMC), ion exchange water, and 2-propanol. In the coating solution, the adjustment was performed so as to have a mass ratio of the inorganic filler, the fine particles containing the polyvinylidene fluoride type resin, and CMC as 96/3/1 and a mass ratio of ion exchange water and 2-propanol as 72.8/27.2. As the polyvinylidene fluoride type resin, a polyvinylidene fluoride type resin, having an average particle diameter of 250 nm and formed of a mixture of 70% by mass of a vinylidene fluoride copolymer (95% by mol of vinylidene fluoride component) and 30% by mass of an acrylic polymer was used.

The equal amount of the obtained coating solution was applied on both surfaces of a polyethylene microporous membrane having a film thickness of 9 μm, a Gurley value of 152 sec/100 cc, a porosity of 43%, and a flow elongation deformation temperature of polyethylene of 140.4° C. using #6 bar coater, and was dried at 60° C.

Accordingly, the non-aqueous-secondary-battery separator of the invention in which the heat-resistant porous layer containing the fine particles containing the polyvinylidene fluoride type resin and the inorganic filler is integrally formed on both surfaces of the polyethylene microporous membrane, was obtained. Regarding the separator of Example 1, Table 1 showed kinds of the organic binder, types of the inorganic filler, the surface where the heat-resistant porous layer is formed, the content of the inorganic filler, the content of the organic binder, and the coating amount of the heat-resistant porous layer, and showed the weight per area, the tortuosity rate, the film thickness, the porosity, the Gurley value, the difference between the Gurley value of the base material and the Gurley value of the composite membrane, the membrane resistance, the difference between the membrane resistance of the base material and the membrane resistance of the composite membrane of the separator which is the composite membrane. Examples and Comparative Examples which will be described later were also shown in Table 1 in the same manner as described above.

Example 2

A coating solution (aqueous dispersion material) having 24.8% by mass of solid content concentration was prepared by uniformly dispersing aqueous emulsion containing fine particles containing a polyvinylidene fluoride type resin, magnesium hydroxide having an average particle diameter of 880 nm, carboxymethyl cellulose (CMC), and ion exchange water. In the coating solution, the adjustment was performed so as to have a mass ratio of the inorganic filler, the fine particles containing the polyvinylidene fluoride type resin, and CMC as 94.0/5.0/1.0. As the polyvinylidene fluoride type resin, a polyvinylidene fluoride type resin, having an average particle diameter of 250 nm and formed of a mixture of 70% by mass of a vinylidene fluoride copolymer (95% by mol of vinylidene fluoride component) and 30% by mass of an acrylic polymer was used.

As the porous base material, a polyethylene microporous membrane having a film thickness of 12 μm, a Gurley value of 243 sec/100 cc, a porosity of 36%, and a flow elongation deformation temperature of polyethylene of 137.4° C. was used. After performing the corona treatment of the surface of the porous base material, the coating solution was applied on one surface of the porous base material using micro gravure and dried at 60° C.

Accordingly, the non-aqueous-secondary-battery separator of the invention in which the heat-resistant porous layer containing the fine particles containing the polyvinylidene fluoride type resin and the inorganic filler is integrally formed on one surface of the polyethylene microporous membrane, was obtained.

Example 3

A coating solution (aqueous dispersion material) having 24.8% by mass of solid content concentration was prepared by uniformly dispersing aqueous emulsion containing styrene-butadiene rubber (SBR) fine particles, magnesium hydroxide having an average particle diameter of 880 nm, carboxymethyl cellulose (CMC), and ion exchange water. In the coating solution, the adjustment was performed so as to have a mass ratio of the inorganic filler, the SBR, and CMC as 93.8/5.0/1.2.

As the porous base material, a polyethylene microporous membrane having a film thickness of 11 μm, a Gurley value of 153 sec/100 cc, a porosity of 46%, and a flow elongation deformation temperature of polyethylene of 140.4° C. was used. After performing the corona treatment of the surface of the porous base material, the equal amount of the coating solution was applied on one surface of the porous base material using #6 bar coater and was dried at 60° C.

Accordingly, the non-aqueous-secondary-battery separator of the invention in which the heat-resistant porous layer containing SBR and the inorganic filler is integrally formed on one surface of the polyethylene microporous membrane, was obtained.

Example 4

A coating solution (aqueous dispersion material) having 24.8% by mass of solid content concentration was prepared by uniformly dispersing aqueous emulsion containing fine particles containing a polyvinylidene fluoride type resin, magnesium hydroxide having an average particle diameter of 880 nm, carboxymethyl cellulose (CMC), ion exchange water, and 2-propanol. In the coating solution, the adjustment was performed so as to have a mass ratio of the inorganic filler, the fine particles containing the polyvinylidene fluoride type resin, and CMC as 98/1/1 and a mass ratio of ion exchange water and 2-propanol as 72.8/27.2. As the polyvinylidene fluoride type resin, a polyvinylidene fluoride type resin, having an average particle diameter of 250 nm and formed of a mixture of 70% by mass of a vinylidene fluoride copolymer (95% by mol of vinylidene fluoride component) and 30% by mass of an acrylic polymer was used.

The equal amount of the obtained coating solution was applied on one surface of a polyethylene microporous membrane having a film thickness of 18 μm, a Gurley value of 119 sec/100 cc, a porosity of 55%, and a flow elongation deformation temperature of polyethylene of 143.0° C. using #6 bar coater, and was dried at 60° C. Accordingly, the non-aqueous-secondary-battery separator of the invention in which the heat-resistant porous layer containing the fine particles containing the polyvinylidene fluoride type resin and the inorganic filler is integrally formed on one surface of the polyethylene microporous membrane, was obtained.

Example 5

A coating solution (aqueous dispersion material) having 24.8% by mass of solid content concentration was prepared by uniformly dispersing aqueous emulsion containing fine particles containing a polyvinylidene fluoride type resin, magnesium hydroxide having an average particle diameter of 880 nm, carboxymethyl cellulose (CMC), and ion exchange water. In the coating solution, the adjustment was performed so as to have a mass ratio of the inorganic filler, the fine particles containing the polyvinylidene fluoride type resin, and CMC as 98/1/1. As the polyvinylidene fluoride type resin, a polyvinylidene fluoride type resin, having an average particle diameter of 250 nm and formed of a mixture of 70% by mass of a vinylidene fluoride copolymer (95% by mol of vinylidene fluoride component) and 30% by mass of an acrylic polymer was used.

As the porous base material, a polyethylene microporous membrane having a film thickness of 11 μm, a Gurley value of 153 sec/100 cc, a porosity of 46%, and a flow elongation deformation temperature of polyethylene of 140.4° C. was used. After performing the corona treatment of the surface of the porous base material, the equal amount of the coating solution was applied on one surface of the porous base material using #6 bar coater and was dried at 60° C.

Accordingly, the non-aqueous-secondary-battery separator of the invention in which the heat-resistant porous layer containing fine particles containing the polyvinylidene fluoride type resin and the inorganic filler is integrally formed on one surface of the polyethylene microporous membrane, was obtained.

Example 6

A coating solution (aqueous dispersion material) having 24.8% by mass of solid content concentration was prepared by uniformly dispersing aqueous emulsion containing fine particles containing a polyvinylidene fluoride type resin, magnesium hydroxide having an average particle diameter of 880 nm, carboxymethyl cellulose (CMC), ion exchange water, and 2-propanol. In the coating solution, the adjustment was performed so as to have a mass ratio of the inorganic filler, the fine particles containing the polyvinylidene fluoride type resin, and CMC as 94/5/1 and a mass ratio of ion exchange water and 2-propanol as 72.8/27.2. As the polyvinylidene fluoride type resin, a polyvinylidene fluoride type resin, having an average particle diameter of 250 nm and formed of a mixture of 70% by mass of a vinylidene fluoride copolymer (95% by mol of vinylidene fluoride component) and 30% by mass of an acrylic polymer was used.

The equal amount of the obtained coating solution was applied on one surface of a polyethylene microporous membrane having a film thickness of 9 μm, a Gurley value of 152 sec/100 cc, a porosity of 43%, and a flow elongation deformation temperature of polyethylene of 140.4° C. using #6 bar coater, and was dried at 60° C.

Accordingly, the non-aqueous-secondary-battery separator of the invention in which the heat-resistant porous layer containing the fine particles containing the polyvinylidene fluoride type resin and the inorganic filler is integrally formed on one surface of the polyethylene microporous membrane, was obtained.

Example 7

A coating solution (aqueous dispersion material) having 24.8% by mass of solid content concentration was prepared by uniformly dispersing aqueous emulsion containing fine particles containing a polyvinylidene fluoride type resin, magnesium hydroxide having an average particle diameter of 880 nm, carboxymethyl cellulose (CMC), and ion exchange water. In the coating solution, the adjustment was performed so as to have a mass ratio of the inorganic filler, the fine particles containing the polyvinylidene fluoride type resin, and CMC as 80/19/1. As the polyvinylidene fluoride type resin, a polyvinylidene fluoride type resin having an average particle diameter of 250 nm, formed of a mixture of 70% by mass of a vinylidene fluoride copolymer (95% by mol of vinylidene fluoride component) and 30% by mass of an acrylic polymer, and Kynar Aquatec ARC (manufactured by Arkema) was used so as to have a solid content mass ratio of 50/50.

The equal amount of the obtained coating solution was applied on one surface of a polyethylene microporous membrane having a film thickness of 9 μm, a Gurley value of 152 sec/100 cc, a porosity of 43%, and a flow elongation deformation temperature of polyethylene of 140.4° C. using #6 bar coater, and was dried at 60° C.

Accordingly, the non-aqueous-secondary-battery separator of the invention in which the heat-resistant porous layer containing the fine particles containing the polyvinylidene fluoride type resin and the inorganic filler is integrally formed on one surface of the polyethylene microporous membrane, was obtained.

Example 8

A non-aqueous-secondary-battery separator was obtained in the same manner as in Example 1, except for using α-alumina having an average particle diameter of 1.0 μm as the inorganic filler in the coating solution and applying the coating solution on one surface of the porous base material.

Example 9

A non-aqueous-secondary-battery separator was obtained in the same manner as in Example 8, except for using a plate-shaped boehmite having an average particle diameter of 1.2 μm as the inorganic filler in the coating solution.

Comparative Example 1

A non-aqueous-secondary-battery separator was obtained in the same manner as in Example 3, except for adjusting the mass ratio of the inorganic filler, SBR, and CMC to be 78.4/20.4/1.2 in the coating solution and applying the coating solution on both surfaces of the porous base material.

Comparative Example 2

A coating solution having solid content concentration of 30% by mass was manufactured by uniformly dispersing polyarylate (glass transition temperature of 201° C.), $SiO_2$ having an average particle diameter of 800 nm, and chlorobenzene. In the coating solution, the adjustment was performed so as to have a mass ratio of the inorganic filler and polyacrylate as 90.0/10.0.

The equal amount of the obtained coating solution was applied on both surfaces of a polyethylene microporous membrane having a film thickness of 9 μm, a Gurley value of 160 sec/100 cc, a porosity of 43%, and a flow elongation deformation temperature of polyethylene of 140.4° C. using #6 bar coater, and was dried at 60° C.

Accordingly, the non-aqueous-secondary-battery separator in which the heat-resistant porous layer containing polyacrylate and the inorganic filler is integrally formed on both surfaces of the polyethylene microporous membrane, was obtained.

Comparative Example 3

A non-aqueous-secondary-battery separator in which the heat-resistant porous layer containing the fine particles containing the polyvinylidene fluoride type resin and the inorganic filler is integrally formed on both surfaces of the polyethylene microporous membrane, was obtained in the same manner as in Example 1 except for applying the equal amount of the coating solution on both surfaces of the polyethylene microporous membrane having a film thickness of 12 μm, a Gurley value of 175 sec/100 cc, a porosity of 51%, and a flow elongation deformation temperature of polyethylene of 138.2° C. using #6 bar coater and drying the coating solution at 50° C.

TABLE 1

| | | Heat-resistant porous layer | | | | Separator properties | | |
|---|---|---|---|---|---|---|---|---|
| | Kinds of organic binder | Kinds of inorganic filler | Formation surface | Inorganic filler content (% by mass) | Organic binder content (% by mass) | Coating amount (g/m$^2$) | Weight per area (g/m$^2$) | tortuosity rate |
| Ex. 1 | PVDF-based resin | Mg(OH)$_2$ | Both surfaces | 96 | 3 | 9.2 | 14.5 | 1.86 |
| Ex. 2 | PVDF-based resin | Mg(OH)$_2$ | One surfaces | 94 | 5 | 10.7 | 16.1 | 1.81 |
| Ex. 3 | SBR | Mg(OH)$_2$ | One surfaces | 94 | 5 | 5.7 | 11.0 | 1.85 |
| Ex. 4 | PVDF-based resin | Mg(OH)$_2$ | One surfaces | 98 | 1 | 5.5 | 13.1 | 1.62 |
| Ex. 5 | PVDF-based resin | Mg(OH)$_2$ | One surfaces | 98 | 1 | 5.3 | 10.7 | 1.77 |
| Ex. 6 | PVDF-based resin | Mg(OH)$_2$ | One surfaces | 94 | 5 | 6.8 | 12.2 | 1.99 |
| Ex. 7 | PVDF-based resin | Mg(OH)$_2$ | One surfaces | 80 | 19 | 10.0 | 15.4 | 1.97 |
| Ex. 8 | PVDF-based resin | Alumina | One surfaces | 96 | 3 | 11.0 | 16.3 | 1.99 |
| Ex. 9 | PVDF-based resin | Boehmite | One surfaces | 96 | 3 | 10.2 | 15.5 | 1.93 |

TABLE 1-continued

| | | | | | | | |
|---|---|---|---|---|---|---|---|
| Com. Ex. 1 | SBR | Mg(OH)$_2$ | Both surfaces | 78 | 20 | 4.6 | 9.9 | 3.18 |
| Com. Ex. 2 | Polyarylate | SiO$_2$ | Both surfaces | 90 | 10 | 4.8 | 10.1 | 2.35 |
| Com. Ex. 3 | PVDF-based resin | Mg(OH)$_2$ | Both surfaces | 96 | 3 | 7.2 | 14.7 | 1.48 |

| | Separator properties | | | | | |
|---|---|---|---|---|---|---|
| | Film thickness (μm) | Porosity (%) | Gurley value (s/100 cc) | \|base material Gurley value − composite membrane Gurley value\| (s/100 cc) | Membrane resistance (ohm · cm$^2$) | \|base material membrane resistance − composite membrane resistance\| (ohm · cm$^2$) |
| Ex. 1 | 19.5 | 51.2 | 185 | 33 | 3.52 | 1.03 |
| Ex. 2 | 21 | 41.0 | 257 | 14 | 4.46 | 1.97 |
| Ex. 3 | 16.1 | 49.1 | 158 | 5 | 2.99 | 0.58 |
| Ex. 4 | 23.1 | 55.3 | 130 | 11 | 2.93 | 0.33 |
| Ex. 5 | 15.6 | 49.4 | 162 | 10 | 2.65 | 0.24 |
| Ex. 6 | 16.3 | 47.6 | 188 | 36 | 3.63 | 1.14 |
| Ex. 7 | 21.5 | 53.0 | 184 | 32 | 4.20 | 1.71 |
| Ex. 8 | 18.2 | 53.4 | 193 | 41 | 3.60 | 1.11 |
| Ex. 9 | 18.5 | 51.5 | 190 | 38 | 3.58 | 1.09 |
| Com. Ex. 1 | 11.9 | 35.5 | 316 | 163 | 9.03 | 6.54 |
| Com. Ex. 2 | 14.5 | 43.6 | 242 | 72 | 4.90 | 2.11 |
| Com. Ex. 3 | 19.6 | 48.0 | 210 | 10 | 2.50 | 0.90 |

[Thermal Dimensional Change Rate]

Each separator described above was cut out to have a size of a width of 3 mm×a length of 16 mm along the MD direction and the TD direction, and thermomechanical analysis (TMA) was performed under conditions of a rate of temperature increase of 5° C./min, in a state where one end of the sample in the longitudinal direction was grasped and a load was applied to the other end thereof with an application load of 19.6 mN. Q400 V22.4 Build 30 was used as the TMA measurement device. This measurement was performed both in the MD direction and the TD direction and the each thermal dimensional change rate was acquired as follows. The results are shown in Table 2.

thermal dimensional change rate=(maximum changed amount of composite membrane)/(length of composite membrane before heating)×100

[Thermal Shrinkage]

Each separator was cut out to have a size of 18 cm (MD direction)×6 cm (TD direction) as a test piece. Regarding the test piece, marks were attached on a line bisecting the length in the TD direction, at portions (point A and point B) 2 cm and 17 cm from the top. In addition, marks were attached on a line bisecting the length in the MD direction, at portions (point C and point D) 1 cm and 5 cm from the left. The sample was clipped (a portion to be clipped is a portion within 2 cm from the top in the MD direction) and was suspended in an oven having a temperature adjusted to 150° C., and the thermal treatment was performed for 30 minutes under tensionless conditions. The lengths between two points A and B and two points C and D were measured before and after the thermal treatment, and the thermal shrinkage was acquired from the following equation.

MD direction thermal shrinkage={(length between A and B before thermal treatment−length between A and B after thermal treatment)/length between A and B before thermal treatment}×100

TD direction thermal shrinkage={(length between C and D before thermal treatment−length between C and D after thermal treatment)/length between C and D before thermal treatment}×100

[Oven Test]

(Preparation of Negative Electrode)

300 g of artificial graphite which is the negative electrode active material, 7.5 g of a water-soluble dispersion containing 40% by mass of a modified styrene-butadiene copolymer which is a binder, 3 g of carboxymethyl cellulose which is a thickener, and a proper amount of water were stirred by a dual arm mixer, and slurry for negative electrode was prepared. The slurry for negative electrode was applied to a copper foil having a thickness of 10 μm which is a negative electrode current collector, the obtained coated film was dried and pressed, and a negative electrode having a negative electrode active material layer was prepared.

(Preparation of Positive Electrode)

89.5 g of lithium cobalt oxide powder which is a positive electrode active material, 4.5 g of acetylene black which is a conductive assistant, and 6 g of polyvinylidene fluoride which is a binder were dissolved in N-methyl-pyrolidone (NMP) so that the concentration of polyvinylidene fluoride becomes 6% by mass, were stirred by a dual arm mixer and slurry for a positive electrode was prepared. The slurry for a positive electrode was applied to an aluminum foil having a thickness of 20 μm which is a positive electrode current collector, the obtained coated film was dried and pressed, and a positive electrode having a positive electrode active material layer was prepared.

(Preparation of Battery)

A lead tab was welded to the positive electrode and the negative electrode, the positive and negative electrodes were bonded to each other through the separator manufactured in Examples and Comparative Examples, electrolyte was impregnated with this, and this was enclosed in the aluminum pack using a vacuum sealer. Herein, as the electrolyte, 1 M $LiPF_6$ ethylene carbonate/ethyl methyl carbonate (mass ratio of 3/7) was used. 20 kg of an applying load was applied per 1 $cm^2$ of electrode using a hot pressing machine, and the hot pressing was performed at 90° C. for 2 minutes, and accordingly, a test battery was manufactured.

(Evaluation of Heat Resistance)

The battery manufactured as described above was charged to 4.2 V. The battery was put in an oven and a weight of 5 kg was loaded thereon. The battery was heated to 150° C. by setting an oven so that the battery temperature increases at 2° C./min in this state, and a change in a battery voltage at that time was observed. It was determined that the heat resistance was good (G) when there was substantially no change in a battery voltage to 150° C., and the heat resistance was bad (NG) when a rapid decrease in a battery voltage was checked at a temperature close to 150° C. The results are shown in Table 2.

C. for 16 hours. This was put in an aluminum pack in an environment of a dew point equal to or lower than −60° C., the electrolyte was further injected thereto, the aluminum pack was sealed with a vacuum sealer, and a measurement cell was manufactured. Herein, as the electrolyte, 1 M $LiPF_6$ ethylene carbonate (EC)/ethyl methyl carbonate (EMC)=3/7 (weight ratio) (manufactured by Kishida Chemical CO., Ltd.) was used. The measurement cell was stored at 85° C. for 3 days and the volumes of the measurement cell before and after the storage were measured. A value obtained by subtracting the volume of the measurement cell before the storage from the volume of the measurement cell after the storage was set as the gas generation amount. Herein, the volume measurement of the measurement cell was performed at 23° C. and is performed using an electron densimeter (manufactured by Alfa Mirage; EW-300SG) according to Archimedes' principle. The results are shown in Table 2.

TABLE 2

|  | Thermal dimensional change rate (%) | | Thermal shrinkage (%) | | Oven test | Cycling characteristics (%) | Load characteristics (%) | Gas generation amount (cc) |
| --- | --- | --- | --- | --- | --- | --- | --- | --- |
|  | MD | TD | MD | TD |  |  |  |  |
| Ex. 1 | 0.2 | 0.4 | 2.4 | 1.8 | G | 96 | 95 | 0.03 |
| Ex. 2 | 1.6 | 0.5 | 2.1 | 1.6 | G | 97 | 96 | 0.04 |
| Ex. 3 | 1.2 | 0.4 | 2.6 | 2.1 | G | 96 | 96 | 0.02 |
| Ex. 4 | 1.1 | 0.3 | 2.5 | 2 | G | 96 | 96 | 0.02 |
| Ex. 5 | 1.1 | 0.4 | 2.5 | 2.1 | G | 97 | 97 | 0.02 |
| Ex. 6 | 1.3 | 0.3 | 2.3 | 1.8 | G | 96 | 95 | 0.03 |
| Ex. 7 | 0.1 | 0.2 | 2.3 | 1.8 | G | 85 | 83 | 0.04 |
| Ex. 8 | 1.4 | 0.6 | 1.9 | 1.5 | G | 82 | 83 | 18.03 |
| Ex. 9 | 1.5 | 0.4 | 2 | 1.6 | G | 82 | 82 | 18.70 |
| Com. Ex. 1 | 0.4 | 0.8 | 2.9 | 2.7 | G | 35 | 35 | 0.02 |
| Com. Ex. 2 | 0.2 | 0.4 | 2.5 | 1.9 | G | 70 | 65 | 0.02 |
| Com. Ex. 3 | 4.6 | 4.1 | 15.8 | 14.3 | NG | 83 | 76 | 0.03 |

[Cycling Characteristics (Capacity Retention)]

10 batteries were manufactured in the same manner as in the oven test. Regarding 10 batteries, the charging condition was set as 1C, constant voltage and constant current charge were set as 4.2 V, the discharging condition was set as 1C, and constant current discharge at cut off was set as 2.75 V, and the charging and discharging were repeated at 25° C. A value obtained by dividing the discharge capacity of $100^{th}$ cycle by initial capacity was set as capacity retention (%), and an average of 10 test batteries was calculated. The results are shown in Table 2.

[Load Characteristics]

Evaluation of discharging properties was performed using the battery manufactured in the same manner as in the oven test. First, 10 cycles of the charge and discharge cycle including constant current·constant voltage charge at 1.6 mA and 4.2 V for 8 hours and constant current discharge at 1.6 mA and 2.75 V were performed, and the discharge capacity obtained from $10^{th}$ cycle was set as discharge capacity of the battery. Next, the constant current·constant voltage charge is performed at 1.6 mA and 4.2 V for 8 hours and constant current discharge is performed at 16 mA and 2.75 V. The capacity obtained at that time was divided by the discharge capacity of the battery in $10^{th}$ cycle, and the obtained numerical value was set as an index of the load characteristics. The results are shown in Table 2.

[Gas Generation Amount]

Each separator which is a sample was cut out to have a size of 240 $cm^2$, and this was dried in a vacuum state at 85°

[Ionic Permeability when Adhesive Porous Layer is Laminated]

The adhesive porous layer was further laminated on each separator of Examples 1 to 3 and Comparative Examples 1 to 3 manufactured as described above and laminated separators of Examples 10 to 18 and Comparative Examples 4 to 6 were obtained. The membrane resistance of the laminated separator was evaluated.

The adhesive porous layer was manufactured as follows. First, a polyvinylidene fluoride-hexafluoropropylene copolymer (PVDF-HFP) having a mass average molecular weight of 1,000,000 was used as the polyvinylidene fluoride type resin. The PVDF-HFP was dissolved in a mixed solvent having a mass ratio of dimethyl acetamide/tripropylene glycol 7/3 at concentration of 5% by mass, and a coating solution was prepared. Equal amount of the coating solution was applied on both surfaces of each separator, the microporous membrane was immersed in the congealed liquid (40° C.) having a mass ratio of water/dimethyl acetamide/tripropylene glycol=57/30/13 for solidification of the resin. This is washed with water and dried, and accordingly, a laminated separator in which total 2.0 $g/m^2$ of the adhesive porous layer formed of the polyvinylidene fluoride type resin is formed on both surfaces of the composite membrane was obtained. The membrane resistance value of the obtained laminate separator is shown in Table 3. Table 3 also showed the membrane resistance values of the separators of Examples 1 to 9 and Comparative Examples 1 to 3 as references. In addition, Table 3 also showed the values (increased membrane resistance) obtained by subtracting the membrane resistance values of the separators (Examples 1 to 3 and Comparative Examples 1 to 3) before laminating the adhesive porous layer from the membrane resistance values of the laminated separators of Examples 10 to 18 and Comparative Examples 4 to 6.

TABLE 3

| | Composite membrane formed of porous base material and heat-resistant porous layer | Membrane resistance when adhesive porous layer is laminated (ohm · cm$^2$) | Increased membrane resistance (ohm · cm$^2$) |
|---|---|---|---|
| | Membrane resistance (ohm · cm$^2$) | | |
| Ex. 10 | Ex. 1 | 3.52 | 4.01 | 0.49 |
| Ex. 11 | Ex. 2 | 4.46 | 4.96 | 0.50 |
| Ex. 12 | Ex. 3 | 2.99 | 3.50 | 0.51 |
| Ex. 13 | Ex. 4 | 2.93 | 3.56 | 0.63 |
| Ex. 14 | Ex. 5 | 2.65 | 3.18 | 0.53 |
| Ex. 15 | Ex. 6 | 3.63 | 4.23 | 0.60 |
| Ex. 16 | Ex. 7 | 4.20 | 4.81 | 0.61 |
| Ex. 17 | Ex. 8 | 3.60 | 4.11 | 0.51 |
| Ex. 18 | Ex. 9 | 3.58 | 4.26 | 0.68 |
| Com. Ex. 4 | Com. Ex. 1 | 9.03 | 10.53 | 1.50 |
| Com. Ex. 5 | Com. Ex. 2 | 4.90 | 5.70 | 0.80 |
| Com. Ex. 6 | Com. Ex. 3 | 2.50 | 5.11 | 2.61 |

The invention claimed is:

1. A non-aqueous-secondary-battery separator comprising: a composite membrane including
a polyolefin microporous membrane; and
a heat-resistant porous layer provided on one or both surfaces of the polyolefin microporous membrane and containing a particulate organic binder and an inorganic filler, wherein the tortuosity rate of the composite membrane is from 1.5 to 2.0, the particulate organic binder contains at least a polyvinylidene fluoride type resin that is selected from the group consisting of a mixture of polyvinylidene fluoride and an acrylic polymer, a mixture of a polyvinylidene fluoride copolymer and an acrylic polymer, and a copolymer of vinylidene fluoride with a monomer component that is selected from the group consisting of an acrylic acid, a methacrylic acid, an acrylic ester and a methacrylic ester, -and the heat-resistant porous layer has a porous structure in which the particulate organic binder and the inorganic filler are connected to each other, and
the difference between the membrane resistance of the composite membrane and the membrane resistance of the polyolefin microporous membrane is equal to or smaller than 0.58Ω·cm$^2$.

2. The non-aqueous-secondary-battery separator according to claim 1,
wherein the membrane resistance of the composite membrane is equal to or smaller than 5Ω·cm$^2$.

3. The non-aqueous-secondary-battery separator according to claim 1,
wherein the thermal dimensional change rate of the composite membrane in each of a longitudinal direction and a width direction, when the composite membrane is heated at least to a flow elongation deformation temperature of the thermoplastic resin at a rate of temperature increase of 5° C./min, is from 0 to 3%.

4. The non-aqueous-secondary-battery separator according to claim 1,
wherein the thermal shrinkage of the composite membrane in each of the longitudinal direction and the width direction, when the composite membrane is subjected to thermal treatment at 150° C. for 30 minutes, is from 0 to 3%.

5. The non-aqueous-secondary-battery separator according to claim 1,
wherein the content of the inorganic filler is from 80% by mass to 99% by mass with respect to the total mass of the organic binder and the inorganic filler.

6. The non-aqueous-secondary-battery separator according to claim 1,
wherein the particulate organic binder further comprises one or more kinds of the resin selected from a group consisting of fluorine rubber, styrene-butadiene rubber, ethylene-acrylate copolymers, carboxymethyl cellulose, hydroxyalkyl cellulose, polyvinyl alcohol, polyvinyl butyral, and polyvinyl pyrrolidone.

7. The non-aqueous-secondary-battery separator according to claim 1,
wherein the inorganic filler is one or more kinds of the filler selected from a group consisting of magnesium hydroxide, magnesium oxide, and magnesium carbonate.

8. The non-aqueous-secondary-battery separator according to claim 1,
wherein an adhesive porous layer containing a polyvinylidene fluoride type resin is further provided on one or both surfaces of the composite membrane.

9. The non-aqueous-secondary-battery separator according to claim 1,
wherein the membrane resistance of the composite membrane is more than 2Ω·cm$^2$ and equal to or smaller than 5Ω·cm$^2$.

10. The non-aqueous-secondary-battery separator according to claim 1,
wherein the membrane resistance of the composite membrane is 2.65 to 5Ω·cm$^2$.

11. The non-aqueous-secondary-battery separator according to claim 8,
wherein a membrane resistance when the adhesive porous layer is laminated is from 3.18 to 4.96Ω·cm$^2$.

12. A non-aqueous secondary battery comprising:
a positive electrode;
a negative electrode; and
the non-aqueous-secondary-battery separator according to claim 1 which is disposed between the positive electrode and the negative electrode,
wherein an electromotive force is obtained by doping and de-doping of lithium.

* * * * *